US007171199B1

(12) United States Patent
Rahman

(10) Patent No.: US 7,171,199 B1
(45) Date of Patent: Jan. 30, 2007

(54) METHOD AND SYSTEM FOR DIRECTING A DATA MESSAGE IN A WIRELESS COMMUNICATIONS NETWORK INCLUDING MULTIPLE WIRELESS SYSTEMS

(75) Inventor: Mohamed Anisur Rahman, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/393,300

(22) Filed: Sep. 10, 1999

(51) Int. Cl.
*H04Q 7/20* (2006.01)

(52) U.S. Cl. ............... 455/433; 455/435.1; 455/432.1; 455/436; 455/552.1; 455/411; 455/554.1

(58) Field of Classification Search ........ 455/432–439, 455/426, 445, 552, 553, 410, 411, 426.1, 455/552.1, 553.1, 442
See application file for complete search history.

(56) References Cited

U.S. PATENT DOCUMENTS 5,222,248 A * 6/1993 McDonald et al. ......... 455/509
5,237,612 A * 8/1993 Raith .......................... 380/247
5,448,619 A * 9/1995 Evans et al. .............. 455/426.1
5,657,375 A * 8/1997 Connolly et al. ........... 455/436

(Continued)

FOREIGN PATENT DOCUMENTS

DE        0762794        3/1997

(Continued)

OTHER PUBLICATIONS

Bremer, Rainer, "Inter-PLMN Handover—An Approach to a Functional Requirement Description," 4th IEEE International Conference on Universal Personal Communications, Nov. 1995, pp. 442-446.*

*Primary Examiner*—George Eng
*Assistant Examiner*—Huy Phan

(57) ABSTRACT

A mobile station scans for electromagnetic signals representing control channels of the public wireless system and the private wireless system. The mobile station measures a received signal parameter of at least one of the scanned control channels. The hybrid communications network may transfer the mobile station's service from the public wireless system to the private wireless system, if the measured signal parameter meets or exceeds a private target. Alternately, the hybrid communications system may transfer service from the private wireless system to the public wireless system, if the measured signal parameter meets or exceeds a public target. A service control point maintains a central database of user profiles updated in response to the transferring procedure. A service node redirects a data message for the mobile station through the public wireless system or through the private wireless system, as facilitated by the central database, to deliver the data message to the mobile station during its operation on an active one of the wireless systems.

20 Claims, 6 Drawing Sheets

U.S. PATENT DOCUMENTS

| | | | |
|---|---|---|---|
| 5,712,900 A * | 1/1998 | Maupin et al. | 455/433 |
| 5,734,699 A | 3/1998 | Lu et al. | |
| 5,870,673 A * | 2/1999 | Haartsen | 455/426.1 |
| 5,890,063 A * | 3/1999 | Mills | 455/433 |
| 5,901,352 A | 5/1999 | St-Pierre et al. | |
| 5,943,333 A * | 8/1999 | Whinnett et al. | 370/345 |
| 5,949,770 A * | 9/1999 | Liu et al. | 370/329 |
| 6,041,358 A * | 3/2000 | Huang et al. | 709/238 |
| 6,073,029 A * | 6/2000 | Smith et al. | 455/555 |
| 6,101,393 A * | 8/2000 | Alperovich et al. | 455/466 |
| 6,104,929 A * | 8/2000 | Josse et al. | 455/445 |
| 6,112,088 A * | 8/2000 | Haartsen | 455/437 |
| 6,208,869 B1 * | 3/2001 | Roberts et al. | 455/465 |
| 6,219,551 B1 * | 4/2001 | Hentila et al. | 455/445 |
| 6,321,096 B2 * | 11/2001 | Lautenschlager et al. | 455/553 |
| 6,345,181 B1 * | 2/2002 | Janhonen et al. | 455/406 |
| 6,459,904 B1 * | 10/2002 | Lorello et al. | 455/466 |
| 6,519,457 B1 * | 2/2003 | Jiang et al. | 455/442 |
| 6,539,237 B1 * | 3/2003 | Sayers et al. | 455/555 |
| 6,553,227 B1 * | 4/2003 | Ho et al. | 455/433 |
| 6,591,103 B1 * | 7/2003 | Dunn et al. | 455/436 |
| 6,801,772 B1 * | 10/2004 | Townend et al. | 455/436 |
| 6,819,945 B1 * | 11/2004 | Chow et al. | 455/567 |

FOREIGN PATENT DOCUMENTS

EP         1063821         12/2000

* cited by examiner

METHOD AND SYSTEM FOR DIRECTING A DATA MESSAGE IN A WIRELESS COMMUNICATIONS NETWORK INCLUDING MULTIPLE WIRELESS SYSTEMS

FIELD OF THE INVENTION

This invention relates generally to a method and system for directing a data message in a wireless communications network including multiple wireless systems.

BACKGROUND

Wireless communications networks may incorporate multiple wireless systems to provide communications services. In one example, a wireless communications network includes a public wireless communications system and a private wireless communication system that cooperate to provide communication services to a common set of subscribers. A private wireless communication system is usually limited to serving subscribers within a coverage area required for a business or governmental entity. For example, a private communications system may serve an office complex or a corporate campus of a commercial entity. A public wireless communications system is accessible to qualified subscribers from the general public and other subscribers who may have access to the private wireless communications system.

A wireless data server ordinarily extends e-mail messaging to subscribers of a public wireless communications system. The conventional wireless data server typically supports message notification and delivery for mobile subscribers. If the subscriber roams to the private wireless communications system from the public wireless communications system, the private wireless communications system often does not support the wireless data server in servicing the subscriber. Accordingly, the roaming subscriber may miss data messages, such as e-mail messages, while active on the private communications system.

In another example, a wireless communications network includes multiple public wireless systems that cooperate to provide communication services to a common set of subscribers who roam from the coverage area of a home public wireless system to a visited public wireless system. The home wireless data server may provide wireless data service to the visiting mobile subscriber visiting on a visiting wireless system. However, the home wireless data server consumes inter-system signaling resources to provide such a message redirection service. The redirection of data messages may be delayed until inter-system signaling capacity is available, rather than providing real-time or timely redirection of data messages. Thus, a need exists for directing a data message in a communications network to enable a roaming subscriber to reliably and timely receive data messages through a private communications system or a public communications system.

SUMMARY OF THE INVENTION

In accordance with one aspect of the invention, a communications network includes a first wireless system and a second wireless system. A mobile station scans for electromagnetic signals representing forward channels of the first wireless system and the second wireless system. The mobile station measures a received signal parameter of at least one of the scanned forward channels. The communications network may transfer the mobile station's data message service from the first wireless system to the second wireless system, if the measured signal parameter meets or exceeds a target value. Alternately, the communications system may transfer service from the second wireless system to the first wireless system, if the measured signal parameter meets or exceeds another target value. A service control point updates a central database of user profiles in response to the transferring procedure. A service node redirects a data message for the mobile station through the first wireless system or through the second wireless system, as facilitated by the central database, to deliver the data message to the mobile station during its operation on an active one of the wireless systems.

In another aspect of the invention, data messages are redirected between wireless systems in a manner that reduces inter-system signaling traffic between the wireless systems.

DETAILED DESCRIPTION

As used herein, the first wireless system may refer to a public wireless system or a private wireless system. Similarly, the second wireless system may refer to a public wireless system or a private wireless system.

Figure 1:
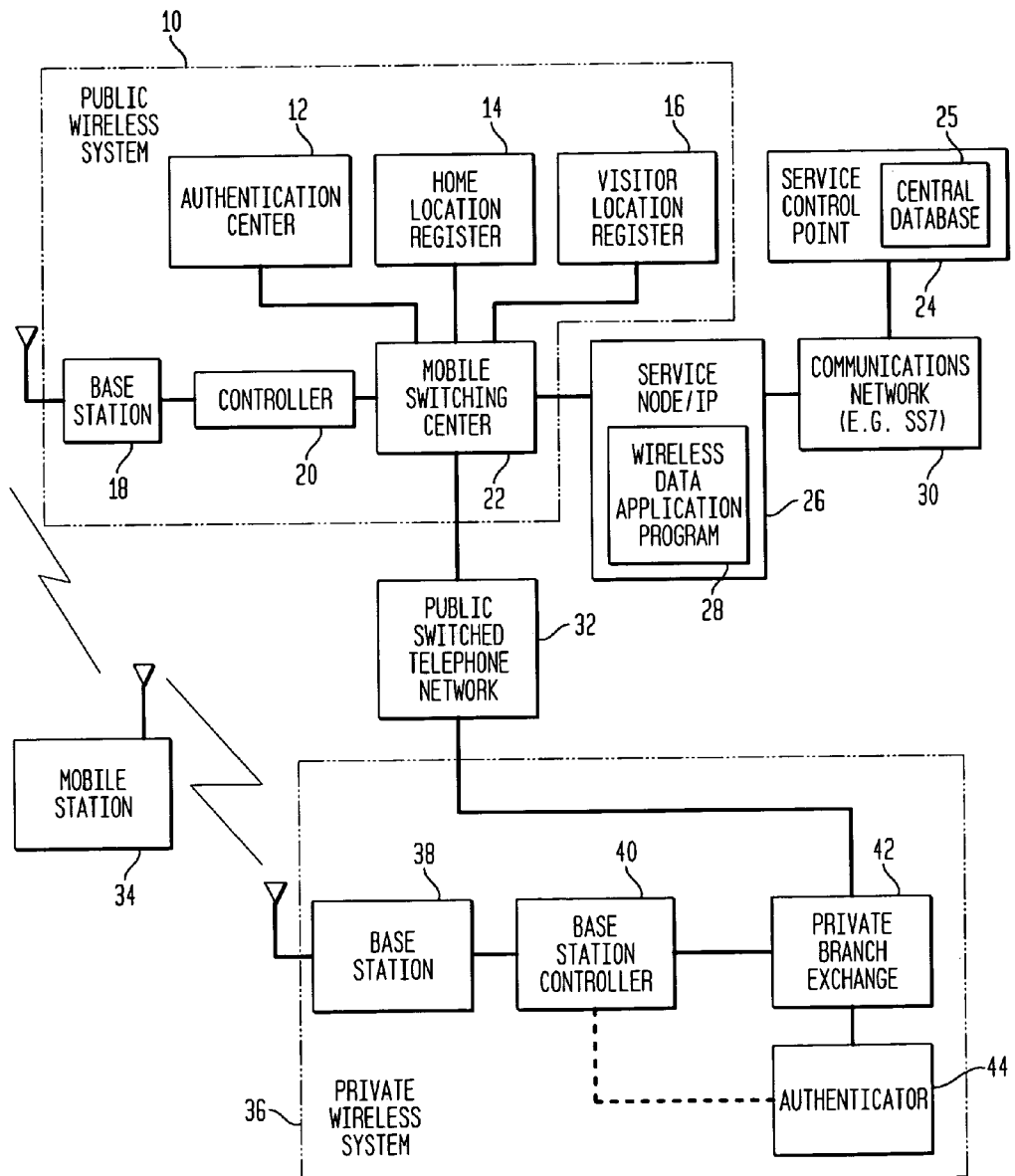
FIG. 1 is a block diagram of a communications network in accordance with the invention.

In accordance with the invention, FIG. 1 illustrates a hybrid communications network including a public wireless system 10 coupled to a private wireless system 36 via a public switched telephone network 32 or another suitable interconnection. The public wireless system 10 includes a base station controller 20 coupled to one or more base stations 18 and a mobile switching center 22. The public wireless system 10 further includes a home location register 14, a visitor location register 16, and an authentication center 12 coupled to the mobile switching center 22. The mobile switching center 22 connects the public wireless system 10 to a service node/intelligent peripheral 26. In turn, the service node 26 is coupled to a service control point 24 via a communications network 30, such as an SS7 network or link.

A mobile station 34 is capable of communicating with the base station 18 of the public wireless system 10 or the private wireless system 36 over a electromagnetic (e.g., radio frequency) channel.

The private wireless system 36 includes a base station controller 40 that is coupled to one or more base stations 38 and a private branch exchange 42. Although an authenticator 44 is preferably connected to the private branch exchange 42, the authenticator 44 may be coupled to the base station controller 40 in addition to or instead of the private branch exchange 42. The private branch exchange 42 is adapted for routing or switching local calls or data messages handled by at least one base station 38. The authenticator 44 is configured for authenticating a mobile identifier of the mobile station 34 to decide whether to grant access of the mobile station 34 to the private wireless system 36. Once a mobile station 34 transfers from the public wireless system 10 to the private wireless system 36, the hybrid communications network supports data message services (e.g., e-mail notification and forwarding) to the mobile station 34 while the mobile station 34 is present in the private wireless system 36.

The private branch exchange 42 has an exchange processor that communicates with a corresponding exchange processor in the mobile switching center 22 to coordinate message redirection between the private wireless system 36 and the public wireless system 10. Accordingly, signals are sent between the exchange processors over the public switched network 32 regarding a call tear-down at the mobile switching center 22 and the call setup at the private branch exchange 42, or vice versa. Call set-up refers to any procedure for establishing a call or data message transmission from or to a mobile station 34. A call set-up may include authentication, channel assignment, paging channel activity, or other communication operations for supporting a call or data message transmission. Call tear-down refers to any procedure that supports the termination of an on-going call or data message transmission associated with a mobile station.

The service node 26 generally comprises a programmable network element with a processing system that supports a wireless data application program 28. The wireless data application program emulates or otherwise performs functions that a wireless data server would perform. In general, the service node 26 and the wireless data application program 28 provide message notification, delivery, forwarding, and redirection mechanisms tailored to mobile stations 34. Instead of being limited to reading e-mail messages on a display of the mobile station 34, the service node 26 preferably has a text-to-speech converter which cooperates with the wireless data application program 28. The wireless data application program 28 may manage hardware associated with the text-to-speech converter or other transcoding operations that support data messaging.

At a mobile station 34, a user may hear converted data messages that were converted by the text-to-speech converter. Further, via a mobile station 34, a subscriber may control message direction services through short messaging service (SMS) messages or via some other transport mechanism.

The mobile station 34 supports both a private wireless system and a public wireless system. In practice, the mobile station 34 may need to support multiple frequency bands, multiple modulation techniques, or both to support both the public wireless system 10 and the private wireless system 36. The mobile station 34 includes one or more intelligent scanning algorithms that select appropriate control channels or pilot channels for scanning so that the mobile station 34 can work on both the public wireless system 10 and the private wireless system 36. Each mobile station 34 has a corresponding user profile that defines the technical features and services that the mobile station 34 supports. The user profile may further include attributes and specifications of supported technical features and services.

A service control point 24 (SCP) may comprise a service node. In general, a service control point 24 is a programmable platform that stores service, logic and subscriber records that are associated with providing telecommunications services. The service control point 24 is capable of communicating with a mobile switching office, a telecommunications switch, a home location register 14, a visitor location register 10, or another communications node. For example, the service control point 24 may communicate with a mobile switching center 22 through a communications network 30 and the service node 26 as an intermediary.

The hybrid communications system may use communications networking techniques or intelligent networking techniques to access the service control point 24 from other network elements, such as the mobile switching center 22 or the private branch exchange 42. In the context of communications networking, the communications network 30 may use a Signal System 7 (SS7) interface, for example. Signaling System 7 is multi-level data protocol for common channel signaling to facilitate communication between network elements. For example, Signaling System 7 establishes rules for communicating call-signaling information, database queries and responses, and operation and maintenance messages between the mobile switching center 22 and the service control point 24.

In the context of intelligent networking, a network element can remotely interrogate a central database 25 resident in, or otherwise associated with the service control point 24, for instructions. For example, the mobile switching center 22 or another network element can obtain such instructions on how to process or route a particular type data message.

The visitor location register 16 and the home location 14 register cooperate with the mobile switching center 22 to provide mobility management of mobile stations 34. The home location register 14 includes a processing system for managing a subscriber database. The subscriber database contains information on the service capabilities and the most recently known locations of corresponding mobile stations 34.

The home location register 14 provides a subscriber database for home mobile stations 34 with the public wireless system 10 designated as their home system. The visitor location register 16 acts as a temporary subscriber database for visiting mobile stations that do not regard the public wireless system 10 as their home system, but nevertheless roam into the coverage area served by the public wireless system 10. The mobile switching center 22 can access the visitor location register instead of a remote home location register (not shown) for various queries or signaling exchanges to promote signaling efficiency.

The authentication center 12 verifies if a mobile station 34 is a valid or authorized user of the public wireless system 10. For example, the authentication center 12 may perform an authentication procedure when a mobile station 34 requests access to the public wireless system on a control channel. The authenticator 44 performs an analogous role to the authentication center 12 for the private wireless system 36 in deciding whether to grant access to a mobile station 34 to the private wireless system 36.

The authenticator 44 may seek to detect some pre-arranged code on a communications channel. For example, the authenticator 44 may generate or store a reference code for comparison with a transmitted code transmitted by the mobile station 34 on the communications channel. If the reference code matches the transmitted code associated with a particular mobile station 34, the particular mobile station 34 is permitted access to the communications system.

Figure 2:
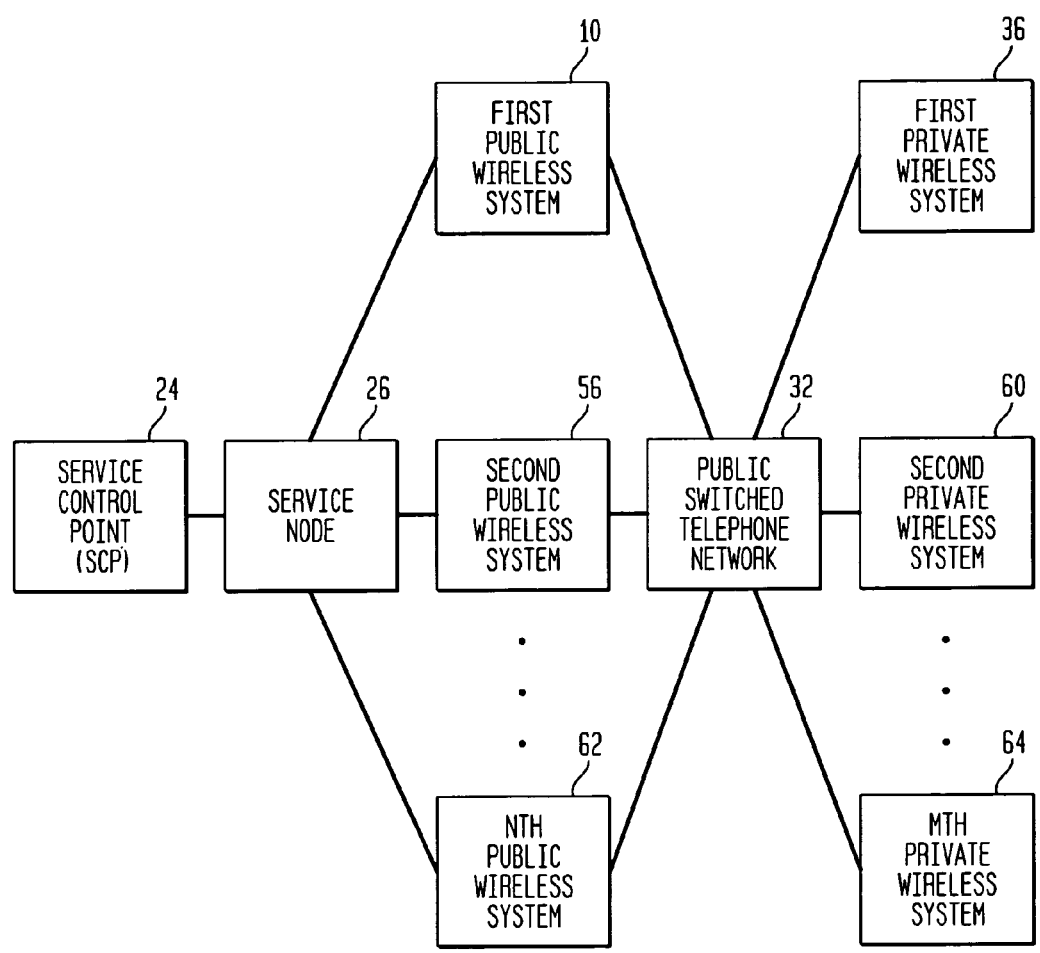
FIG. 2 is a block diagram illustrating a network topology for multiple wireless communications systems in accordance with the invention.

FIG. 2 illustrates a hybrid system including multiple public wireless systems and multiple private wireless systems. Like reference numerals in FIG. 1 and FIG. 2 indicate like elements. The service node 26 and the public switched telephone network 32 are coupled to a first public wireless system 10, a second public wireless system 56, up to an nth public wireless system 62. Further, the public switched telephone network 32 is coupled to a first private wireless system 36, a second private wireless system 60, up to an mth private wireless system 64. Any number of m private wireless systems may be used in conjunction with any number of n public wireless systems.

Data messages are delivered to the mobile station 34 regardless of whether the mobile station 34 is active on the private wireless system 36 or the public wireless system 10 through coordination between the private wireless system 36 and the public wireless system 10. For example, in one embodiment, the service control point 24 provides updates to the home location register and/or the visitor location register to support the direction of data messages to mobile stations 34 that are active on the private wireless system 36 or public wireless system 10. That is, the service control point 24 updates the home location register 14 and the visitor location register 16 with mirror or duplicate records of dual-mode user profiles of those in the central database 25. The central database 25 in the service control point 24 is adapted to provide the service nodes 26 with proper redirection information directly upon query or indirectly through the home location register 14 or a visitor location register 16.

In an alternate embodiment, the home location register 14 or the visitor location register 16 may merely contain pointers to dual-mode user profiles in the central database 25 to conserve storage space in the home location register 14 or the visitor location register 16.

The architecture of FIG. 2 is well-suited for providing transparent wireless data service in a hybrid communications network that includes one or more private wireless system and public wireless systems. Advantageously, the method of the invention uses the distributed processing capability of home location registers in the public wireless system, while updating user profiles in the home location registers from a central database 25.

Figure 3:
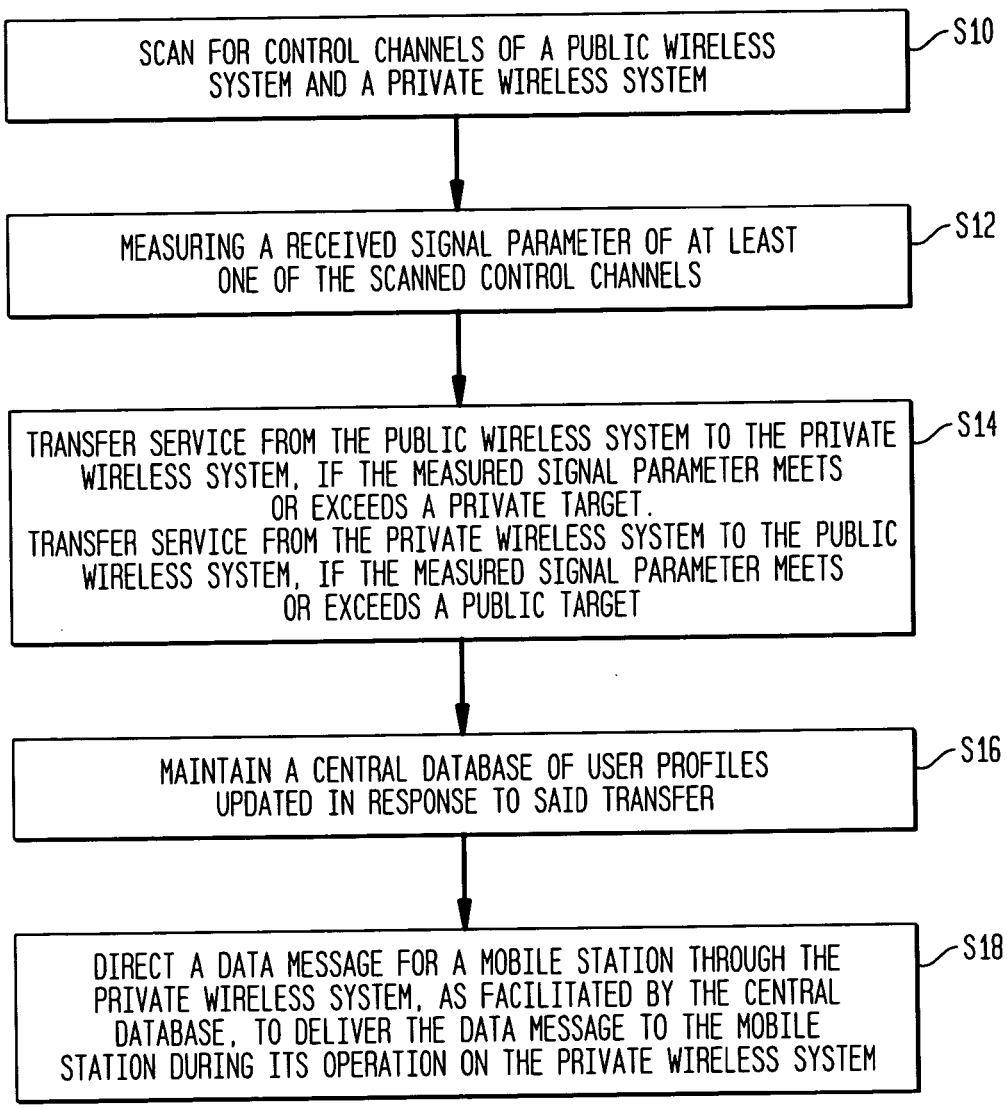
FIG. 3 is flow chart of a method for directing a data message associated with a communications network in accordance with the invention.

In accordance with the invention, a method supports message redirection in a hybrid communications network, such as the hybrid network shown in FIG. 1. FIG. 3 illustrates a flow chart of the method according to the present invention. As shown in step S10, the mobile station 34 scans a list of channels to receive control channels or pilot channels of a public wireless system 10 and a private wireless system 36. The channels may be defined by different codes, time slots, frequencies or the like. A scanning algorithm determines the list of the channels to be scanned in a scanning sequence, the order of the channels scanned in the scanning sequence, the dwell time of reception on each scanned channel, and any waiting time between the end of a prior scanning sequence and the start of a later scanning sequence. The scanning continues on a regular or periodic basis during an ongoing call presently supported by the public wireless system 10 or the private wireless system 36.

A forward pilot channel of a code-division, multiple-access (CDMA) system typically represents a generally unmodulated signal without data or voice traffic. Nevertheless, the forward pilot channel is encoded with a pseudo-random noise code that identifies a sector or cell within a communications network. The mobile station 34 may periodically scan both the public pilot channels of a public CDMA system and the private pilot channels of a private CDMA system. Further, while a mobile station 34 is registered with a private CDMA system and can receive its forward private pilot channel with adequate signal strength and adequate pilot pseudo-noise (PN) sequence offset, the mobile station 34 will still scan for other pilot channels, such as a public pilot channel.

In step S12, the mobile station 34 measures a received signal parameter of at least one of the scanned control channels or pilot channels. A received signal parameter preferably refers to signal strength, although in an alternate embodiment, the received signal parameter may refer to a signal-to-noise ratio, a signal-to-interference ratio, an error rate, a frame-error rate, a bit-error rate, or any other suitable measure of signal reliability. The mobile station 34 maintains a record of measured signal quality versus transferee channel identifiers for one or more scanning sequences to assist the mobile station 34 in determining whether or not to transfer the mobile station 34 to a wireless communications system represented by one of the measured channels consistent with maintaining reliable communications. The signal parameter may be measured over one or more scanning sequences such that the measured signal parameters may be mathematically manipulated to yield averaged measured signal parameters.

Following step S12 in step S14, the controller 20, the mobile switching center 22, the private branch exchange 42, and the base station controller 40 transfer the mobile station's communications service between the public wireless system 10 and the private wireless system 36, if the following transferring conditions are satisfied: (1) suitable measured signal parameter value for the transferee pilot or control channel; and (2) successful authentication procedure by the transferee wireless system. The controller 20, the mobile switching center 22, or both determine whether to transfer from the public wireless system 10 to the private wireless system 36 based on the above transferring conditions or other prudential considerations. The controller 40, the private branch exchange 42, or both determine whether to transfer from the private wireless system 36 to the public wireless system 10 based on the above transferring conditions or other prudential considerations. After the transferring conditions are satisfied, the transfer is primarily coordinated between the mobile switching center 22 and the private branch exchange 42. Each of the foregoing transferring conditions are described in detail below.

A mobile station 34 may have its communications service transferred from the public wireless system 10 to the private wireless system 36, if the measured signal parameter of the private control channel or the pilot channel meets or exceeds a private target value for a defined duration consistent with the measuring and the scanning procedure. Conversely, a mobile station 34 may have its communication service transferred from the private wireless system 36 to the public wireless system 10, if the measured signal parameter of the public control channel or pilot channel meets or exceeds a public target value for a defined duration consistent with the measuring and the scanning procedure and if the private wireless system 36 no longer provides adequate service based on the geographic location of the mobile station 34. Notwithstanding the foregoing, the mobile station 34 preferably has the capability to request the enablement or disablement of transfers between the public communications system and the private communications system.

Although the mobile station 34 preferably operates on the private wireless system 36 under conditions of substantially equal measured signal parameters associated with the private wireless system 36 and the public wireless system 10, in an alternate embodiment, the mobile station 34 may be instructed to operate on the public wireless system 10 if the measured signal parameters from the private wireless system 36 and the public wireless system 10 are substantially equal or fall within a range of each other.

Both the private wireless system 36 and the public wireless system 10 support authentication to prevent unauthorized access by a particular mobile station 34 having an unauthorized or prohibited mobile identifier. The public wireless system 10 authenticates a mobile station 34 transferring from the private wireless system 36 to the public wireless system 10. The private wireless system 36 authenticates a mobile station 34 transferring from the public wireless system 10 to the private wireless system 36. The public wireless system 10 or the private wireless system 36 may deny access to a mobile station 34, where appropriate, based on the outcome of the authentication procedure.

If the particular mobile station 34 is authenticated by the transferee wireless system, the transferee wireless system sends an appropriate response (e.g., traffic channel assignment) to the mobile station 34 over the control channel or a paging channel. After a mobile station's access to the transferee wireless system is verified through successful conclusion of the authentication procedure, the transfer is authorized.

The private branch exchange 42 may prevent the mobile station 34 from retransferring to the public wireless system after transferring from the public wireless system 36 to the private wireless system 10, unless a timer has expired or unless a signal parameter differential between the private wireless system and the public wireless system is maintained for a minimum period. Conversely, the mobile switching center 22 may prevent the mobile station 34 from retransferring to the private wireless system after transferring from the private wireless system 36 to the public wireless system 10, unless a timer has expired or unless a signal parameter differential between the private wireless system 36 and the public wireless system 10 is maintained for a minimum period. The minimum period is selected to prevent the mobile station from fluctuating between operation on the private wireless system 36 and the public wireless system 10 such that multiple successive transfers between the private wireless system 36 and the public wireless system 10 do not generate excessive or unnecessary control-traffic related to message redirection operations.

In step S16, the service control point 24 updates a central database 25 of dual-mode user profiles in response to the transferring in step S14. Dual-mode mobile stations are authorized to access communications service provided by both the private wireless system and the public wireless system. The service control point 24 acquires deregistration data and registration data communicated from the home location register 14, the visitor location register 16, or the private branch exchange 42. Each transfer preferably generates deregistration data from the transferring communication system and registration data from the transferee communications system. The service control point 24 maintains a central depository of the registration data and the deregistration data on transfers between the private communications system and the public communications system.

Deregistration data varies depending upon whether the mobile station 34 is deregistering from the public wireless network or the private wireless network. Deregistration data preferably includes a cell identifier and a mobile switching center identifier of the public wireless system from which the mobile station 34 is deregistering. Deregistration data may include a private system identifier and a private branch exchange identifier of the private wireless system from which the mobile station 34 is deregistering. The deregistration data includes a deregistration flag indicating a deregistration state and a mobile identifier.

Registration data varies depending upon whether the mobile station is registering from the public wireless network or the private wireless network.

Registration data preferably includes a cell identifier and a mobile switching center identifier of the public wireless system on which the mobile station 34 is registering. Registration data may include a private system identifier and a private branch exchange identifier of the private wireless system from which the mobile station 34 is registering. The registration data also includes a registration flag indicating a registration state and a mobile identifier.

The dual-mode user profiles may be organized by a mobile identifier and a time-stamp indicating the last update of the records associated with the mobile identifier. The dual-mode user profiles in the central database 25 for a mobile subscriber contain necessary location information or other information for redirecting data messages and locating the mobile station after the mobile station is transferred between the public wireless system 10 and the private wireless system 36. The dual-mode profiles include forwarding addresses of the corresponding mobile stations in the private wireless system and direct addresses of corresponding mobile stations in the public wireless network.

For example, the direct address may include (or be derived from) a mobile identifier, a mobile switching center identifier, and a cell identifier relating to the transferee public wireless system. The forwarding address may include (or be derived from) a mobile identifier, a private exchange identifier, and a private wireless identifier (e.g., C number) relating to the transferee private wireless system.

The mobile switching center 22, the home location register 14, or the visitor location register 16 transmits a signaling message, containing a mobile identifier, a mobile switching center identifier, a cell identifier to update a dual-mode user profile in response to a transfer of a particular mobile station 34 to the public system 10. The private branch exchange 42 transmits a mobile identifier, a private branch exchange identifier and a private system identifier (e.g., a C number) to the service control point 24 to update the dual-mode user profile in response to a transfer of a particular mobile station 34 to a private wireless system 36. The service control point 24 assembles the dual-mode user profiles by the update information received from the mobile switching center 22, the home location register 14, the visitor location register 10, the private branch exchange 42, or any combination of the foregoing network elements during or after a transfer of the mobile station 34 from the transferring wireless system to the transferee wireless system.

The base station controller 40, the private branch exchange 42, or both assigns the private system identifier for a corresponding private communications network 30 based on a geographic location of the private communications network. Each private system identifier is preferably based on a general geographic location of a corresponding private wireless system 36. For example, the service control point 24 assigns a private system identifier (e.g., C number or code) for a corresponding private wireless system 36 based on geographic coordinates of the radio frequency coverage area of private wireless system 36. Accordingly, the private system identifier sent from the service control point 24 to the home location register 14 or the visitor location register 16 will depend upon where the mobile station 34 was located when the deregistration from the public wireless system took place. In an alternate embodiment, the service control point 24 may assign a system identifier having specific geographic coordinates of the mobile station 34, rather than general coordinates or central site coordinates that vaguely identify the overall coverage area of the private wireless system 36.

Once the central database 25 is updated for a transfer of a particular mobile station, the service control point 24 may in turn update subscriber profile information in the home location register 14, a visitor location register 16, or both of the public wireless system 10 last affiliated with the mobile station 34 prior to the transfer or newly affiliated with the mobile station 34 after the transfer. The home location register 14 provides a master database that contains comprehensive user profiles for all subscribers that are associated with the public wireless system as home subscribers. In contrast, the central database 25 stores user profiles (e.g., C factors) for dual mode subscribers that have access to both the private wireless system 36 and the public wireless system 10 in a private mode and in a public mode, respectively. The central database 25 preferably requires less storage capacity than the home location register 14 because the dual-mode subscribers are a subset of the public mode subscribers. The central database 25 may use compatible data storage formats to facilitate the rapid and unencumbered exchange of data between the home location register 14 and the central database 25.

In step S18, a service node 26 detects the presence or receipt of a data message addressed to an intended recipient mobile station active in the private wireless system 36 or the public wireless system 10. The service node 26 is adapted to query the home location register 14, the visitor location register 16, the service control point 24, or any combination of the foregoing network elements for registration or deregistration information in response to the detection of the detected data message.

The service node 26 retrieves the latest location data associated with the mobile station from one of the foregoing network elements to facilitate redirection of data messages to the proper private wireless system or public wireless system. The location data may include the forwarding address of the mobile station in the private wireless system. The forwarding address is distinguished from a direct address, which refers to the address of the mobile station on the home public wireless system 10.

In accordance with the above redirection scheme, a publicly registered mobile station receives communications service over the air interface of the public wireless system 10 on which the mobile station is registered. Similarly, a privately registered mobile station receives communications service over the air interface of the private wireless system 36 on which the mobile station is registered. The central database 25 preferably maintains a database of private and public registrations on a real-time basis for dual-mode subscribers that are authorized for both the public wireless system 10 and the private wireless system 36. If the mobile station is registered on a private wireless system 36, the service control point 24 and the central database 25 facilitate data message redirection for the visiting mobile station visiting the private wireless system.

The method of FIG. 3 is readily applied to the context of a CDMA private wireless system and public wireless system. In a CDMA configuration, if the mobile station locates a private pilot channel with sufficient signal strength, adequate pilot pseudo-noise (PN) sequence offset, and appropriate time delay relative to the mobile station's time, the mobile station may transfer to the private wireless system by using that private pilot channel. Accordingly, when the mobile station comes within the range of the private network in a CDMA system, the mobile station can automatically switch from public cellular service mode (PLMN) to private cordless service mode. Further, the mobile station may provide an e-mail forwarding request to the public wireless system to activate the forwarding address for receipt of data messages while roaming in the private wireless system. If the mobile station loses contact with the private CDMA system, the mobile station preferably, automatically reverts back to CDMA public cellular service mode. Thus, data messages are delivered in a reliable and transparent manner to the mobile station, regardless of location in the public or private wireless system.

Figure 4:
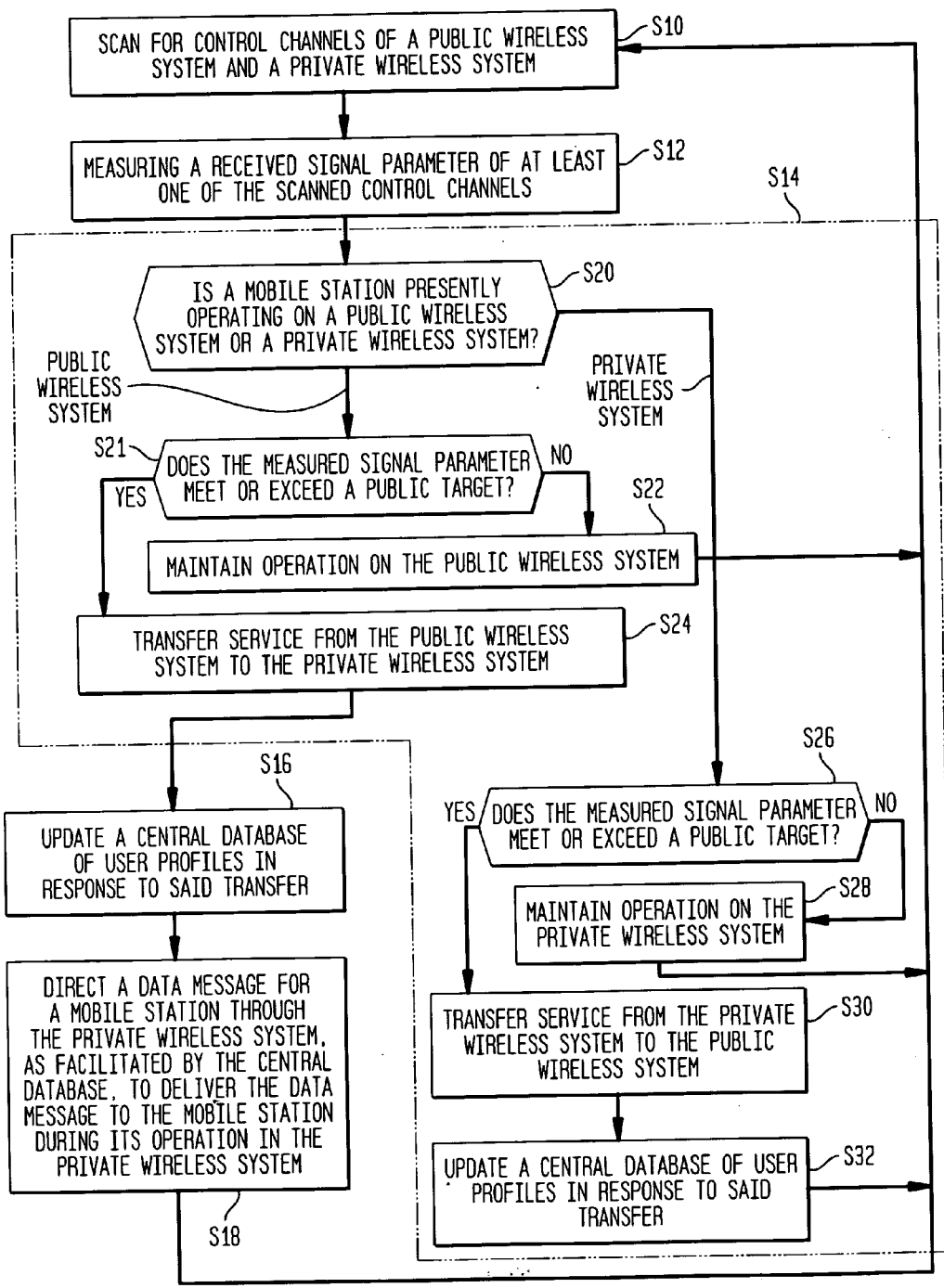
FIG. 4 is a flow chart of a procedure for transferring communications service between a private wireless system and a public wireless system in accordance with FIG. 3.

FIG. 4 describes step S14 of FIG. 3 in more detail. Like reference numbers indicate like steps in FIG. 3 and FIG. 4. Beginning from step S20, a mobile station 34 determines if the mobile station 34 is operating on a public wireless system 10 or on a private wireless system 36. If the mobile station 34 is operating on a public wireless system 10 the method continues with step S21. However, if the mobile station 34 is operating on a private wireless system 36, the method continues with step S26.

In step S21, the mobile station 34 determines if the measured signal parameter meets or exceeds a private target value. If the measured signal parameter meets or exceeds the private target value, the method continues with step S24. If not, the message continues with step S22. In step S24, the mobile switching center 22 and the private branch exchange 42 coordinate a transfer of service (e.g., data message reception service) after receiving a transfer request or an access request from the mobile station 34 to transfer from the public wireless system 10 to the private wireless system 36. The mobile station 34 is transferred to operation on the private wireless system 36, if the aforementioned transferring conditions are satisfied. After step S24, the method continues with the step S16.

In step S22, the mobile station 34 maintains its operation on the public wireless system 10 by appropriately acknowledging or responding to control messages transmitted by the base station 18 and originated by the base station controller 20 or the mobile switching center 22. Following step S22, the method continues with step S10.

In step S26, sometimes occurring after step S20, the mobile station 34 determines if the measured signal parameter meets or exceeds a public target value. If the mobile station 34 meets or exceeds a public target value, the method continues with step S30. If the mobile station 34 does not meet or exceed a public target value, the method continues with step S28.

In step S30, the mobile switching center 22 and the private branch exchange 42 cooperate to transfer the mobile station's service (e.g., data message reception service) from the private wireless system 36 to the public wireless system 10. The mobile station 34 generates an access request or a transfer request to initiate the transfer from the private wireless system 36 to the public wireless system 10. The transfer occurs of the aforementioned transferring conditions are satisfied.

After step S30 in step S32, a service control point 24 maintains a central database 25 of user profiles of mobile stations 34. The service control point 24 updates the central database 25 through communication with a mobile switching center 22, a private branch exchange 42, or both through an intermediary communications network 30.

In step S28, the mobile station 34 maintains operation on the private wireless system by appropriately acknowledging or responding to control signals of the private branch exchange 42. Following step S28 or step S32, the method progresses with step S10.

In a preferred embodiment, the service node 26 first queries the home location register 14 or the visitor location register 16 of the last known public communications system on which the intended recipient mobile station associated with the detected message, was active. To accomplish this end, the service node 26 may maintain a database of the activity status of particular mobile station 34 to facilitate querying an appropriate visitor location register 16 or home location register 14, rather than all visitor locations registers and the home location register, generally. If the home location register 14 or the visitor location register 16 cannot provide the requested registration or deregistration information, the service node 26 queries the service control point 24 for the request registration or deregistration information of the intended recipient mobile station associated with the detected data message as a last resort.

The service control point 24 or the home location register 14 informs the wireless data server of the registration information or the deregistration information of the mobile station 34 having a mobile station identifier. The activity status describes whether the mobile station 34 is using the private wireless system 36 or the public wireless system 10 and the communications system identifier of the active one of the communications systems.

When a particular mobile station 34 is registered to the private wireless system 36, the wireless data application program 28 forwards the incoming e-mail to the telephone number or address of the particular mobile station 34 on the private wireless system 36. However, to enable such e-mail forwarding, the service provider, the subscriber, or both preferably must enable the e-mail forwarding feature in the user profile associated with the mobile station 34. The mobile station 34 may request the forwarding of the data message by sending a forwarding activation flag from a mobile station 34 to the central database 25 for storage in the central database 25 under the control of the service control point 24. The service node 26 monitors for the activation flag and begins a message redirection procedure as required. The service node 26, acting as a wireless data server, preferably redirects a data message from the public wireless system 10 to the private wireless system with reference to the home location register 14, the visitor location register 16, or the central database 25 associated with the service control point 24, if the registration/deregistration information so indicates. From the central database 25, the home location register 14, the visitor location register 16, or otherwise, the service node 26 obtains a user profile identifying the time and user location in which the user was last active on a private wireless system 10 with a particular system identifier. The service node 26 may initiate the private branch exchange 42 to conduct a paging request based on the latest known time and user location to establish a communications channel with the mobile station 34 suitable for sending the forwarded e-mail.

Figure 5:
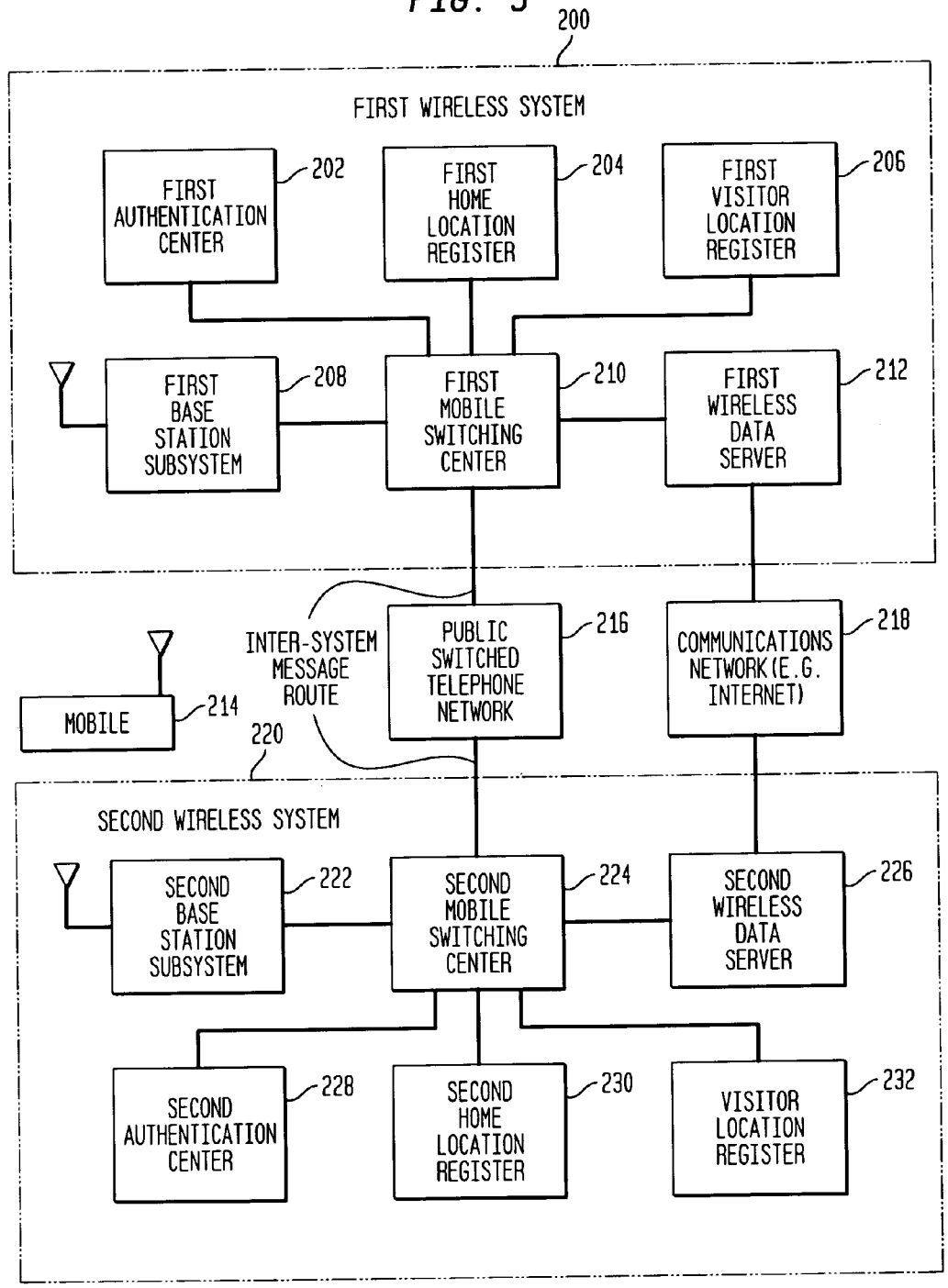
FIG. 5 is a block diagram of a communications network including a first wireless system and a second wireless system in accordance with the invention.

FIG. 5 is a block diagram of a communications system including a first wireless system 200 and a second wireless system 220. The first wireless system 200 and the second wireless system 220 may each comprise public wireless systems. The first wireless system 200 and the second wireless system 220 may be interconnected by a public switched telephone network 216, a communications network 218 (e.g. internet), or both. The first wireless system 200 includes a first mobile switching center 210 that is connected to a first base station subsystem 208, a first authentication center 202, a first home location register 204, a first visitor location register 206, and a first wireless data server 212. The second wireless system 220 includes a second mobile switching center 224 that is connected to a second base station subsystem 222, an authentication center, a second home location register 230, a second visitor location register 232, and a second wireless data server 226.

For explanatory purposes, assume a mobile operates in a home mode over the first wireless system 200 and a visiting mode over the second wireless system 220. If the mobile station 214 is in the first coverage area of the first wireless system 200, the first wireless data server 212 directs data messages between the mobile station 214 and the communications network 218. Further, the first wireless data server 212 performs any necessary transcoding to change the data format from the communications network 218 into a mobile format that is compatible with a mobile station 214, or vice versa. The first wireless data server 212 and the second wireless data server 226 may comprise communications nodes.

Although the FIG. 5 shows that a first visitor location register 206 and a first home location register 204 are separate, some wireless systems may combine the functionality of any visitor location register 232 and any home location register and refer to the combined database as a mobility manager, a location register or otherwise. Such variations in organization of the visitor location register 232 and home location register fall within the scope of the invention. Further, although only one wireless data server is shown in FIG. 5 for each wireless system, in practice multiple wireless data servers may serve each wireless system.

Figure 6:
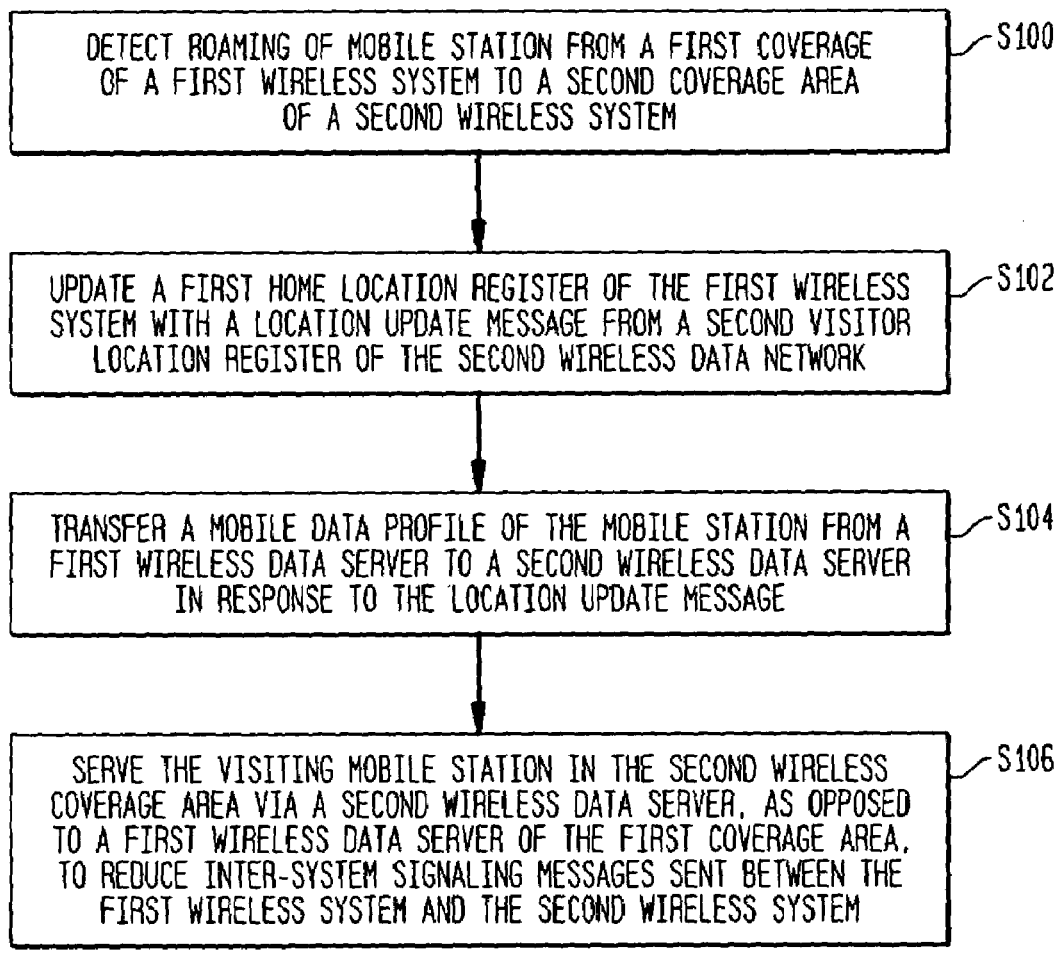
FIG. 6 is a flow chart of a method for reducing inter-system signaling between the first wireless system and the second wireless system of FIG. 5.

FIG. 6 is a flow chart that explains the method for reducing inter-system signaling between the first wireless network and the second wireless network of FIG. 5.

In step S100, the second authentication center 228 detects roaming of the mobile station 214 from the first coverage area of the first wireless network to the second coverage area of a second wireless system 220 when the roaming mobile station 214 requests access to the second wireless system 220. The second authentication center 228 validates the identity of the roaming mobile station 214 and executes security algorithms to prevent fraudulent access to the second wireless system 220.

The mobile station 214 may request access on the second wireless system 220 under a prodigious assortment of circumstances. The first wireless system 200 and the second wireless system 220 may serve mobile stations 214 over contiguous coverage areas, disjointed coverage areas, overlapping coverage areas, or any combination of the foregoing coverage areas. Although the mobile station may request access to the second wireless system 220 from the first wireless system 200 during a hand-off procedure in certain contexts, the mobile station may request access to the second wireless system 220 outside of any hand-off procedure.

In the context of the transferring of data message service between contiguous or overlapping coverage areas, the mobile station 214 may request access to the second wireless system 220 during or after the mobile station's progression from the first coverage area of the first wireless system 200 to the second coverage area of the second wireless system 220. For example, the mobile station 214 may measure a signal performance parameter (e.g., signal strength of the first pilot of the first base station subsystem 222) associated with the downlink signals of the first base station subsystem 208 and the second base station subsystem 222. The wireless network may transfer data message service from the first wireless system 200 to the second wireless system 220 if the measured signal parameter of the downlink signal of the second base station subsystem 222 meets or exceeds a target value, for example.

The second wireless system 220 registers the visiting mobile station 214 and updates the location of the visiting mobile's station in the second visitor location register 232 through a location update message. The location update message is supported in an IS-41 standard as well as the GSM (Global System for Mobile Communications) standard.

In step S102, the second visitor location register 232 updates a first home location register 204 of the first wireless system 200 with a location update message and an active address of the second wireless data server 226 from the second wireless data network. The active address facilitates delivery or redirection of data messages received at the first wireless data server 212 to the second wireless data server 226. The first wireless data server 212 may communicate with the first home location register 204 to attain the active address for redirection. Alternately, the active address may be stored at the first wireless data server 212 and updated by the first home location register 204 on a regular basis to facilitate message redirection to the mobile station 214 in the second wireless system 220.

The first home location register 204 and the first visitor location register 206 are readily accessible by the first wireless data server 212. The second home location register 230 and the second visitor location register 232 are readily accessible by the second wireless data server 226. Communications protocol and support between first home location register and the second visitor location register 232 or between the second home location and the first visitor location register 206 readily accommodates transfer of the location update message and the active address between the first wireless data server 212 and the second wireless data server 226. The data base in the first home location register 204, the second home location register 230, the first visitor location register 206, and the second visitor location register 232 may be modified to include one or more new fields to support addresses of the first wireless data server 212 or the second wireless data server 226, which is serving a mobile station 214 at any given time.

In step S104, the first wireless data server 212 transfers a mobile data profile of the mobile station 214 from the first wireless data server 212 to the second wireless data server 226 in response to the location update message. The mobile data profile of the mobile station 214 is stored in the first wireless data server 212, the second wireless data server 226, or both. The mobile data profile may reflect technical parameters of the first wireless data server 212, the second wireless data server 226, and a corresponding mobile station 214 associated with the mobile data profile.

The first home location register 204 receives a location update message and an active address of the second wireless data server. Upon receipt of the location update message and the active address, the first home location register 204 sends a request to the first wireless data server 212 to transfer mobile profile data to the second wireless data server 226. At least two alternative techniques are available for transferring the mobile data profile from the first wireless data server 212 to the second wireless data server 226. In accordance with a first technique, the mobile data profile is communicated from the first wireless data server 212 to the second wireless data server 226 via a communications network 218 (e.g., internet.) The first wireless data server 212 and the second wireless data server 226 require appropriate interfaces for communicating over the communications network 218.

In accordance with a second technique, the first wireless data server 212 communicates the mobile data profile through the first mobile switching center 210, the public switched telephone network 216, and the second mobile switching center 224 to arrive at the second wireless data server 226. However, instead of sending the mobile profile over the public switched telephone network 216, a dedicated data channel between the first mobile switching center 210 and the second switching center may be used. Where the first wireless data server 212 and the second wireless data server 226 cooperate to communicate in such a manner, the mobile data profile of the visiting mobile station 214 need only be sent as little as once for each visit to the second wireless system 220. In practice, the mobile data profile may be transmitted more than once, because of repetition for error correction or reliability improvement.

Under the second technique, the communications route between the first mobile switching center 210 and the second mobile switching center 224 may be referred to as an inter-system message route. Inter-system signaling messages include such messages as IS41 messages and GSM-MAP (Global System for Mobile Communications-Mobile Applications Part) messages and other control/overhead messages to support roaming between the first wireless system 200 and the second wireless system 220. By transitioning service to the visiting mobile station 214 in the second coverage area from the first wireless data server 212 to the second wireless data server 226 as soon as practical after movement of the mobile station 214 from the first coverage area to the second coverage area, inter-system message signals that would otherwise be necessary to support the service of the first wireless data sever to the visiting mobile station 214 are reduced or eliminated.

In step S106, the mobile station 214 serves the visiting mobile station 214 in the second wireless coverage area via a second wireless data server 226, as opposed to a first wireless data server 212 of the first coverage area to reduce inter-system signaling messages sent between the first wireless system 200 and the second wireless system 220. The mobile station 214 is served by the second wireless data server 226, instead of the first wireless data server 212 while logged into the second wireless system 220.

Where the mobile station 214 is roaming in the second coverage area, the second wireless data server 226 needs to allocate a memory in the second wireless data server 226 for the visiting or roaming mobiles incoming and/or outgoing data messages. Accordingly, any data message intended or addressed to the visiting mobile station 214 at the first wireless system 200 is readily redirected to the new data server. The data messages are transmitted without significant delay to the visiting mobile station 214 and signaling messages are avoided to support the data message delivery to the visiting mobile station 214.

This specification describes various illustrative embodiments of the system and method of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features which are consistent with the spirit and the scope of the invention disclosed herein.

The invention claimed is:

1. A system for directing a data message in a hybrid communications network, including a first wireless system and a second wireless system, the system comprising:
   a central database, independent of the first and second wireless system, the central database configured to send update information to update a user profile in the first wireless system in response to service for a mobile station being transferred from the first wireless system to the second wireless system, the user profile being updated to indicate that data messaging services are being provided to the mobile station by the second wireless system based on received transfer information, the transfer information including deregistration information from the first wireless system, wherein the first wireless system is one of a private and a public wireless system, and if the first wireless system is a private wireless system, the second wireless system is a public wireless system, and if the first wireless system is a public wireless system, the second wireless system is a private wireless system; and
   a service node for directing a data message for a mobile station through the second wireless system, as facilitated by the updated user profile, to deliver the data message to the mobile station during its operation on the second wireless system.

2. The system according to claim 1 further comprising an authenticator for authenticating the mobile station during or after the transfer from the first wireless system to the second wireless system.

3. The system according to claim 1, wherein
   the first wireless system is a public wireless system,
   and the deregistration information includes at least one of a mobile switching center identifier and a cell identifier.

4. The system according to claim 1, wherein
   the second wireless system is a private wireless system, which is assigned a private system identifier number based on a geographic location of the private wireless system, and
   the central database is configured to receive and store a signaling message containing registration information from the second wireless system, the registration information including the private system identifier.

5. The system according to claim 1, wherein
   the second wireless system is a private wireless system that includes a private branch exchange for assigning a private system identifier for the private wireless system based on geographic coordinates of the mobile station within the private wireless system, and
   the central database is configured to receive and store a signaling message containing registration information from the second wireless system, the registration information including the private system identifier.

6. The system according to claim 1 further comprising a service control point for maintaining the user profile.

7. A method of managing data messages, comprising:
   sending deregistration data including at least one of a mobile switching center identifier and a cell identifier from a first wireless system to a central database based on a mobile station transferring from the first wireless system to a second wireless system, the central database being independent of the first and second wireless system and being a database for indicating which wireless system provides data messaging services for the mobile station;
   receiving update information for the mobile station from the central database, the update information including an identifier of the second wireless system; and
   updating a user profile of the mobile station in at least one of a home location register and a visitor location register based on the received update information, the user profile being updated to indicate that the second wireless system provides data messaging services to the mobile station, and wherein
   the first wireless system is one of a private and a public wireless system, and if the first wireless system is a private wireless system, the second wireless system is a public wireless system, and if the first wireless system is a public wireless system, the second wireless system is a private wireless system.

8. The method of claim 7, wherein the step of sending deregistration data includes sending a signaling message to the central database during or after the transferring of the mobile station, the signaling message including a mobile identifier and information identifying the first wireless system.

9. The method of claim 8, wherein
   the first wireless system is a public wireless system, and
   the step of sending deregistration data includes sending at least one of a mobile switching center identifier and a cell identifier as the information identifying the first wireless system.

10. The method of claim 7, further comprising:
    cooperating, at the first wireless system, with the second wireless system to transfer service to the second wireless system, if a signal parameter measured at the mobile station satisfies a first transfer condition.

11. The method of claim 10, further comprising:
    cooperating, at the first wireless system, with the second wireless system to transfer service back to the first wireless system, if the signal parameter measured at the mobile station satisfies a second transfer condition.

12. A method of managing data messages, comprising:
    sending registration data from a first wireless system to a central database based on a mobile station transferring from a second wireless system to the first wireless system, the central database being independent of the first and second wireless system and being a database for updating a user profile in at least the second wireless system which wireless system provides data messaging services for the mobile station, the central database further configured to receive and store a signaling message containing deregistration information including at least one of a mobile switching center identifier and a cell identifier from the second wireless system; and
    receiving a data message for the mobile station from a service node, the service node directing the data message based on the updated user profile in the second wireless system, and wherein
    the first wireless system is one of a private and a public wireless system, and if the first wireless system is a private wireless system, the second wireless system is a public wireless system, and if the first wireless system is a public wireless system, the second wireless system is a private wireless system.

13. The method of claim 12, further comprising:
    sending the received data message to the mobile station.

14. The method of claim 12, wherein the step of sending registration data includes sending a signaling message to the central database during or after the transferring of the mobile station, the signaling message including a mobile identifier and information identifying the first wireless system.

15. The method of claim 14, wherein
the first wireless system is a private wireless system, and
the step of sending registration data includes sending a private system identifier as the information identifying the first wireless system, the private system identifier being assigned based on a geographic location within the coverage area of the first wireless system.

16. The method of claim 12, further comprising the step of:
cooperating, at the first wireless system, with the second wireless system to transfer service to the first wireless system, if a signal parameter measured at the mobile station satisfies a first transfer condition.

17. The method of claim 16, further comprising the step of:
cooperating, at the first wireless system, with the second wireless system to transfer service back to the second wireless system, if the signal parameter measured at the mobile station satisfies a second transfer condition.

18. A method of managing data messages, comprising:
receiving information based on a mobile station transferring from a first wireless system to a second wireless system, the received information including deregistration data, the deregistration data including at least one of a mobile switching center identifier and a cell identifier, from the first wireless system and registration data from the second wireless system;
updating a central database based on the received information, the central database being independent of the first and second wireless system and being a database for indicating which wireless system provides data messaging services for the mobile station; and
sending update information to the first wireless system, the update information being used by the first wireless system to update a user profile of the mobile station in at least one of a home location register and a visitor location register to indicate that the second wireless system provides data messaging services to the mobile station, and wherein
the first wireless system is one of a private and a public wireless system, and if the first wireless system is a private wireless system, the second wireless system is a public wireless system, and if the first wireless system is a public wireless system, the second wireless system is a private wireless system.

19. The method of claim 18, further comprising:
receiving at a service node a data message for the mobile station;
querying the first wireless system based on the received data message;
receiving an indication from the first wireless system that the second wireless system is providing data messaging services to the mobile station; and
directing a data message for the mobile station from the service node to the second wireless system.

20. The method of claim 18, further comprising:
receiving at a service node a data message for the mobile station;
querying the central database based on the received data message;
receiving an indication from the central database that the second wireless system is providing data messaging services to the mobile station; and
directing a data message for the mobile station from the service node to the second wireless system.

* * * * *